United States Patent [19]
Yamamoto

[11] Patent Number: 5,723,184
[45] Date of Patent: Mar. 3, 1998

[54] METHOD AND APPARATUS FOR ATOMIZING AN ORGANIC COMPOUND

[76] Inventor: Christopher W. Yamamoto, 11637 Linden St., Caldwell, Id. 83605

[21] Appl. No.: 694,513

[22] Filed: Aug. 9, 1996

[51] Int. Cl.$^6$ ............................................ B05D 1/02
[52] U.S. Cl. .................. 427/421; 118/58; 118/300; 239/135; 239/290; 239/302; 239/418; 239/433; 427/600
[58] Field of Search ................... 427/421, 600, 427/485; 118/300, 58; 239/135, 290, 302, 418, 433

[56] References Cited

U.S. PATENT DOCUMENTS

| | | | |
|---|---|---|---|
| 5,219,120 | 6/1993 | Ehrenberg et al. | 427/600 X |
| 5,580,596 | 12/1996 | Winkelmann et al. | 426/637 X |

*Primary Examiner*—Michael Lusignan
*Attorney, Agent, or Firm*—Angus C. Fox, III

[57] ABSTRACT

A method and apparatus are disclosed for atomizing or vaporizing chloroprofam or any other organic compound that is a solid at ambient temperature and pressure conditions. The method provides an air stream that can be nearly saturated with chloroprofam vapor and free of both combustion products and carrier solvents. In addition, the temperature of the air stream can be maintained at a temperature that is sufficiently low that it will not adversely affect tubers which are bathed in the air stream. The method includes introducing heated liquified chloroprofam under extreme pressure into a moving air mass within an atomization duct. An apparatus by which the method may be practiced includes a fluid delivery tube which transports liquified chloroprofam under pressure, first to a liquid-heating heat exchanger, and second to a discharge nozzle within a vaporization duct. As the liquid chloroprofam passes through the liquid-heating heat exchanger, it is heated just before it is expelled by the discharge nozzle into the vaporization duct. Pressurization of the chloroprofam within the delivery tube prevents it from boiling as it is heated and while it is en route to the discharge nozzle. The heated pressurized chloroprofam is introduced into an air stream flowing through the atomization duct that is propelled by a blower. Before reaching the nozzle, the air stream is heated by an air-heating heat exchanger. Atomization or vaporization may be assisted by spraying the heated chloroprofam onto a heated plate or onto an ultrasonic vibrator element.

35 Claims, 4 Drawing Sheets

---

Providing a supply of liquid organic compound

↓

Pressurizing the liquid organic compound

↓

Heating the pressurized liquid organic compound

↓

Introducing the heated, pressurized liquid organic compound into an airstream in order to atomize the compound FIG. 1
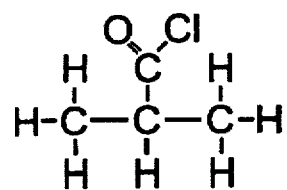
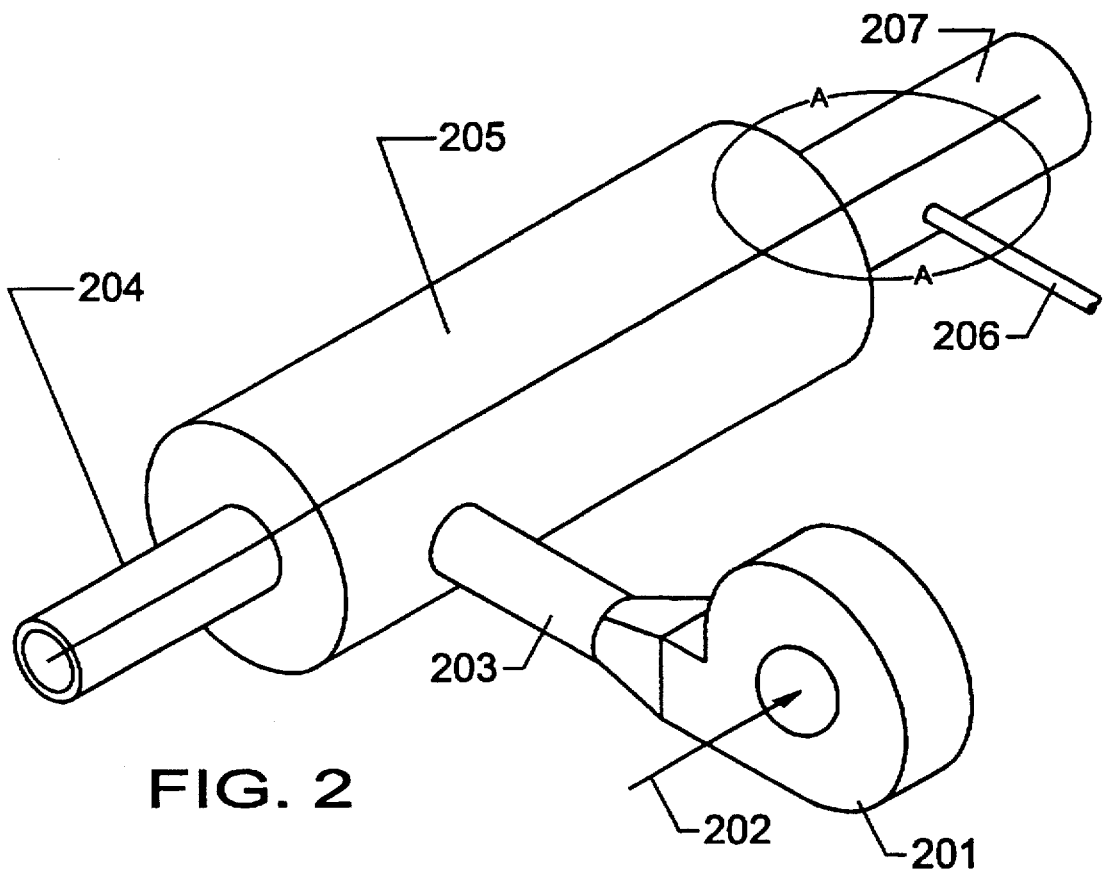
FIG. 2
FIG. 2A
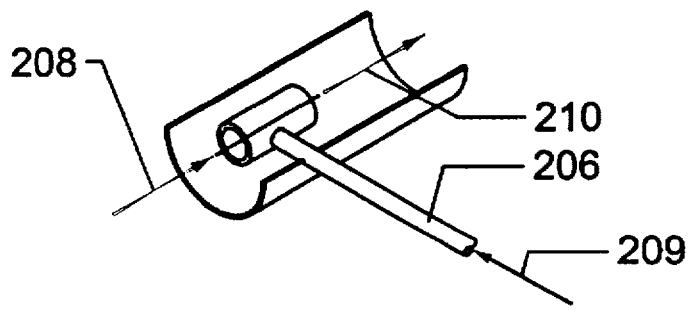

METHOD AND APPARATUS FOR ATOMIZING AN ORGANIC COMPOUND

BACKGROUND OF THE INVENTION

1. Field of the Invention

This invention relates to a method and apparatus for atomizing isopropyl-3-chlorocarbonilate, an organic compound commonly known as chloroprofam that is used to suppress sprouting of tubers, such as potatoes, during storage.

2. Description of Related Art

It is often desirable to store certain agricultural produce until a sale under favorable economic terms can be consummated and the produce delivered to the purchaser. During storage, it is essential that freshness of the produce be maintained. Tubers, such as potatoes, are frequently stored in dark, underground storage cellars where the temperature is maintained within a range of about 40° to 55° F. Untreated tubers will generally sprout over time, even in the absence of light. If the sprouting is allowed to continue unchecked, the tubers become commercially worthless. Isopropyl-3-chlorocarbonilate, an organic compound commonly known as chloroprofam and marketed under a variety of trade names, has been used for decades to suppress the sprouting of tubers, such as potatoes. The molecular structure of chloroprofam is depicted in FIG. 1. Chloroprofam has a melting point of about 41° C., a vaporization temperature of about 246° C., and a vapor flash point of about 427° C.

In order to suppress the sprouting of a tuber, the tuber must be covered with a thin film of chloroprofam. This is typically accomplished by subjecting the tuber to an atmosphere containing atomized chloroprofam, and allowing the atomized compound to condense on the tuber.

The conversion of chloroprofam liquid to its atomized state has, heretofore, been accomplished using several methods. The first conversion method employs the apparatus depicted in FIG. 2 and FIG. 2A. A motor-driven fan or blower 201 propels ambient air 202 through an induction tube 203 into a burner assembly 205. A hydrocarbon fuel enters the burner assembly 205 through fuel inlet 204. The moving air mass 202 provides oxygen for a continuous combustion process which takes place within the burner assembly 205. Through exhaust duct 207, a heated moving air mass 208 (including products of combustion) exits the burner assembly at temperatures within a range of about 400° C. to 600° C. A solution 209, containing both chloroprofam and a carrier solvent, is pumped into the heated moving air mass 208 with a mechanical metering pump (not shown) through injector tube 206. The solution 209 atomizes as it is injected into the heated moving air mass 208. The resulting aerosol (i.e., a mixture of heated air and atomized organic liquid) 210 exits the exhaust pipe 207. The mixture 210 is then ducted to a tuber storage facility via duct work (not shown).

The heretofore described method for generating chloroprofam aerosol has several drawbacks. It is well known that the by-products of combustion, the vaporized solvent carriers and the high temperatures used for the atomization process adversely affect stored tuber products. The adverse effects resulting from the use of such a process include an increase in raw sugar levels and a darker fry color of potatoes stored after treatment with atomized chloroprofam generated using the heretofore described method.

Therefore, an improved method of generating atomized chloroprofam was developed which eliminates carrier solvents from the aerosol with which the tubers are treated, reduces the temperature of the aerosol, and eliminates combustion products from the moving air mass. The improved method is used in connection with the apparatus depicted in FIG. 3. Ambient air 301 is propelled by a motor-driven blower 302 through a filter 303 and then through a first heat exchanger 304, where the air is heated to a temperature within a range of about 200° C. to 370° C., and preferably within a range of about 315° C. to 345° C., to create a heated moving air mass 305 which exits the first heat exchanger 304 through exhaust duct 306. A solution of chloroprofam and a carrier solvent, is heated within a heating/supply vessel 307 in order to drive off the carrier solvent through vent tube 308. The purified melted chloroprofam 309 is pumped, via a metering pump 310, through a heated hose 311 to a discharge nozzle assembly 312 located within an exhaust duct 306. Additionally, atmospheric air is compressed with an air compressor 313 and the compressed air 314 is fed to the discharge nozzle assembly 312 via an air delivery conduit 315. In route to the nozzle assembly 312, the compressed air 314 passes through a second heat exchanger 316, which raises the temperature of the compressed air to a temperature within a range of about 350°–400° C. The merging of the stream of heated chloroprofam 309 and the stream of compressed air 314 at the nozzle assembly 312 assists in the atomization of the chloroprofam 309 as it is injected by the nozzle assembly 312 into the heated moving air mass 305. The atomized chloroprofam mixes with the heated moving air mass 305 to form an aerosol 317. The aerosol 317 is ducted to a tuber storage facility (not shown).

It is easily recognized that the improvement in the atomization process was brought about by a tremendous increase in apparatus complexity. What is needed is a less complex, less costly, and less maintenance-intensive system which provides the same advantages of elimination of combustion products and carrier solvents from the air flow stream and reduced air stream temperature.

SUMMARY OF THE INVENTION

The present invention provides both a method and apparatus for atomizing chloroprofam or any other organic compound. For the purposes of this disclosure, atomization produces an "aerosol" that may be described as a colloidal suspension within an air mass of single large molecules or droplets consisting of multiple smaller molecules. Vaporization, on the other hand, implies that all liquid molecules have been converted to the gas phase. In the gas phase, the individual molecules have sufficient kinetic energy to overcome the attractive forces which would normally cause the molecules to condense to the liquid state. Whether the gas phase or the aerosol phase prevails is largely a question of energy input. An aerosol is easily converted to the gas phase through the input of energy. The method provides an air stream that can be nearly saturated with atomized chloroprofam and free of both combustion products and carrier solvents. In addition, the temperature of the air stream can be maintained at a temperature that is sufficiently low that it will not adversely affect tubers which are bathed in the aerosol. The apparatus required to practice the method is far less complex than equipment currently employed to produce atomized chloroprofam having similar characteristics.

The method includes the steps of purifying chloroprofam from a solution of chloroprofam and a carrier solvent by heating the solution and driving off the carrier solvent. Alternatively, the method may begin with solid chloroprofam. In either case, the purified chloroprofam, whether derived from a solution or a block of solidified material, is heated at atmospheric pressure to a temperature above the melting point, but below the boiling point. The melted chloroprofam is then pressurizedlaced under ultra-high pressure, after which it is heated and sprayed into a heated moving air stream, causing the sprayed droplets of chloroprofam to atomize. The air stream is heated sufficiently above the saturation temperature so that, while the air stream cools while en route to the tuber storage facility, saturation or condensation of atomized chloroprofam within the air stream is minimized.

The apparatus includes a supply chamber for either melting solid chloroprofam or driving off solvent from a solution of chloroprofam and solvent in order to supply liquid chloroprofam having a high degree of purity to a high-pressure, constant-speed pump. The pump transports the liquid chloroprofam under pressure, first to a liquid-heating heat exchanger, and second to a discharge nozzle located within a duct, via a fluid delivery tube. Within the fluid delivery tube, the liquid chloroprofam is maintained under pressure. As the liquid chloroprofam passes through the first heat exchanger, it is heated prior to being expelled by a discharge nozzle into an atomization duct. The high pressure within the delivery tube prevents the liquid chloroprofam from boiling within the fluid delivery tube. Via the nozzle located in the duct, the heated liquid chloroprofam is introduced into a heated air stream that is propelled by a blower through the duct. Prior to reaching the nozzle, the air stream is heated by an air-heating heat exchanger. Ideally, the temperature to which the air stream is heated is sufficiently above the saturation temperature so that, while the air stream cools while en route to the tuber storage facility via an aerosol delivery conduit, little or no saturation or condensation of atomized chloroprofam within the aerosol delivery conduit will occur. To assist in the complete atomization of the heated chloroprofam liquid, either a heated plate or an ultrasonic vibrator is positioned so that chloroprofam liquid discharged from the nozzle impacts thereon. The heated plate imparts additional thermal energy to the liquid, while the ultrasonic vibrator provides additional kinetic energy to the liquid, thus shattering the stream of liquid emitted from the nozzle into tiny droplets which are more easily atomized.

BRIEF DESCRIPTION OF THE DRAWINGS

FIG. 1 depicts the chemical structure of chloroprofam;

FIG. 2 is an isometric view of a first prior art apparatus utilized for the atomization of chloroprofam;

FIG. 2A is an isometric cut-away view of the exhaust tube of FIG. 2, taken through the line A—A;

PREFERRED EMBODIMENT OF THE INVENTION

The present invention represents a significant advance in technology for atomizing or vaporizing an organic compound such as chloroprofam. The invention includes both a method and several embodiments of an apparatus for effecting the atomization or vaporization. The method produces an air stream that can be nearly saturated with atomized or vaporized chloroprofam, yet be free of both combustion products and carrier solvents. In addition, the temperature of the air stream can be maintained at a temperature that is sufficiently low that it will not adversely affect agricultural produce, such as tubers, which are bathed in the aerosol-containing air stream.

Figure 3:
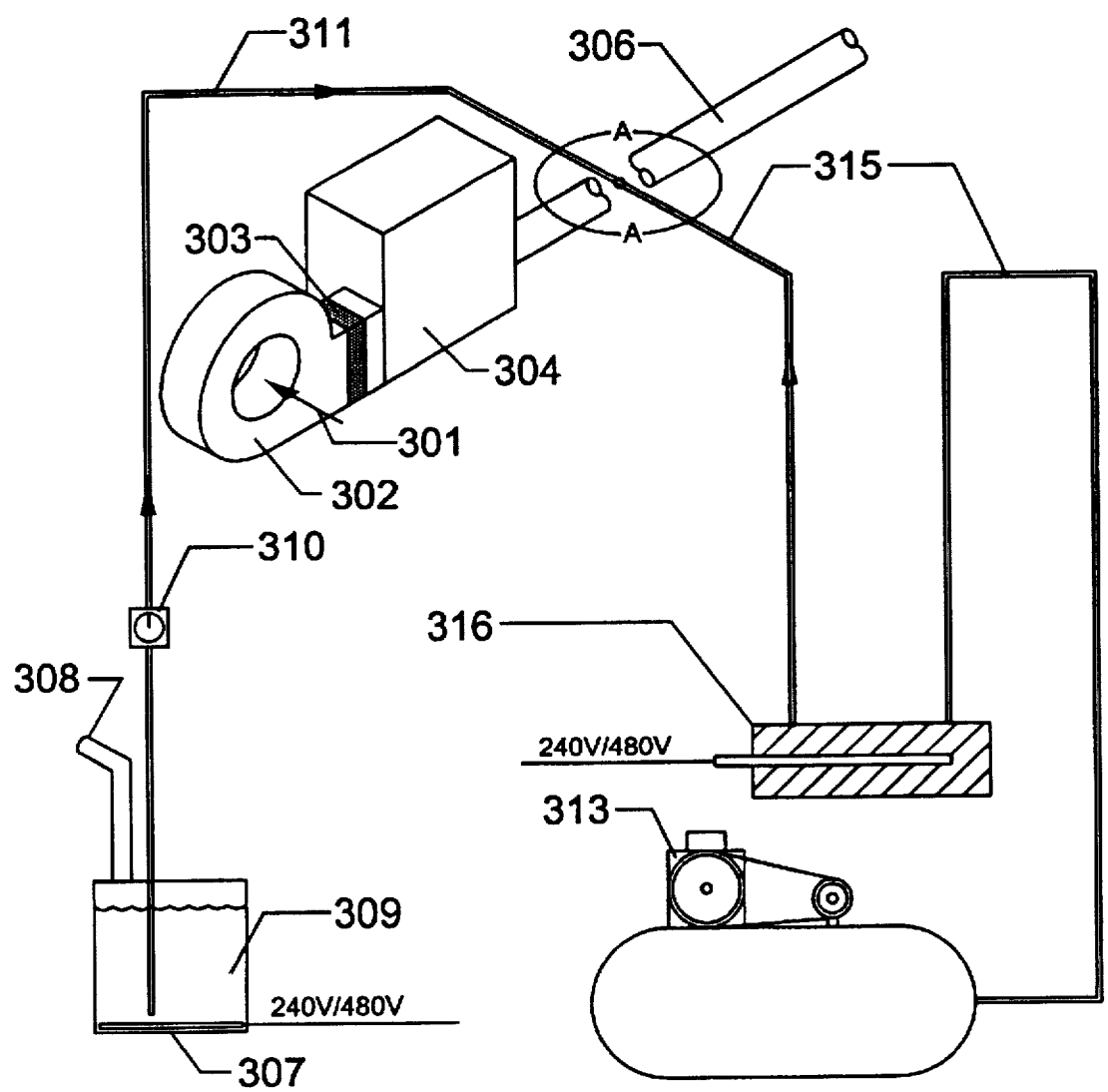
FIG. 3 is an isometric view of a second prior art apparatus utilized for the atomization of chloroprofam.
Figure 3A:
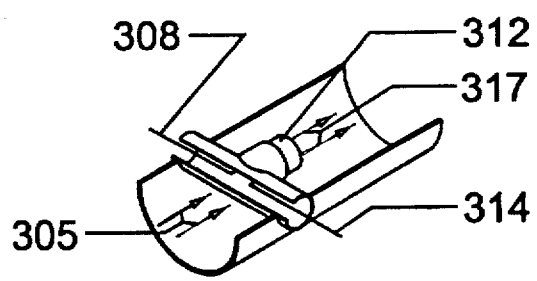
FIG. 3A is an isometric cut-away view of the exhaust tube of FIG. 3, taken through line A—A.
Figure 4:
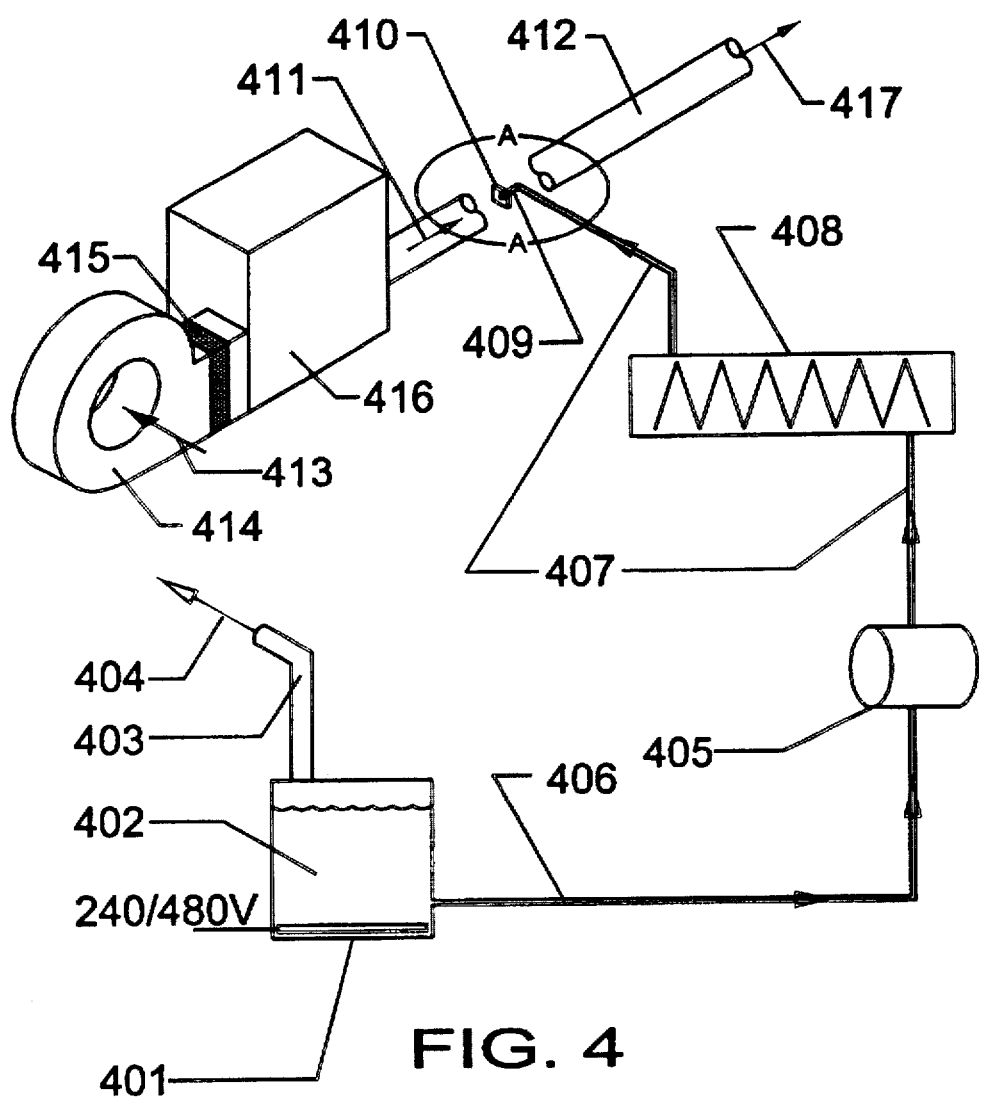
FIG. 4 is an isometric view of an improved apparatus which may be utilized for the atomization of chloroprofam.
Figure 4A:
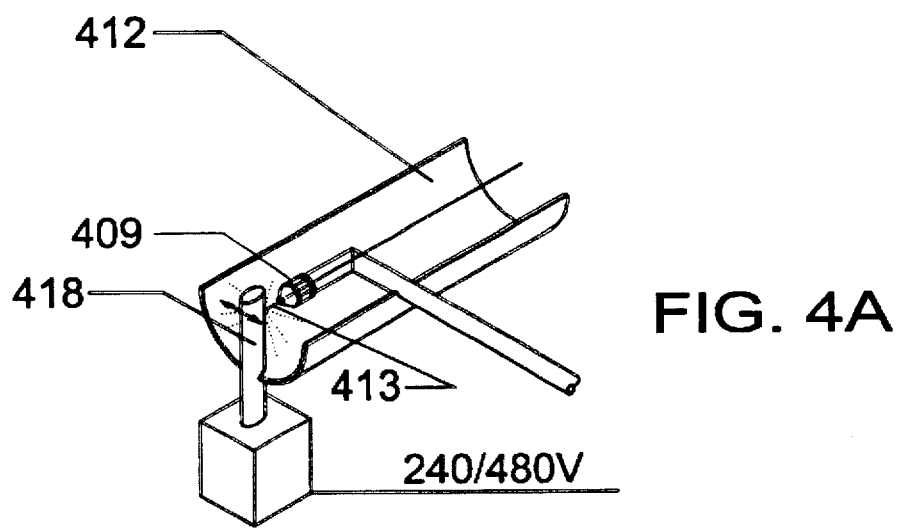
FIG. 4A is an isometric cut-away view of the exhaust tube of FIG. 4, taken through line A—A.

Referring now to FIG. 4 and FIG. 4A, the apparatus includes a supply chamber 401 for either melting solid chloroprofam or driving off solvent 404 from a solution of chloroprofam and solvent through vent 403 in order to supply melted chloroprofam 402 having a high degree of purity to a high-pressure, constant-speed pump 405 through take-up tube 406. The pump 406 transports the melted chloroprofam 402 under pressure via a fluid delivery tube 407, first to a liquid-heating heat exchanger 408, and then to a discharge nozzle 409 located within atomization duct 412. Within the fluid delivery tube 407, the melted chloroprofam 402 is maintained at a pressure within a range of about $2.76 \times 10^6 N/m_2$ to $1.38 \times 10_7 N/m_2$ (400 psi to 2,000 psi), with the preferred pressure being within a range of about $3.45 \times 10_6 N/m_2$ to about $6.9 \times 10_6 N/m_2$ (500 psi to 1,000 psi). As the melted chloroprofam 402 passes through the liquid-heating heat exchanger 408, it is heated to a temperature within a range of about 149° C. to 371° C. (a.temperature range of about 246° C. to 315° C. is deemed to be the preferred range) just before it is expelled by the discharge nozzle 409 into a heated air stream 411 flowing through atomization duct 412. The high pressure within the delivery tube 407 prevents the chloroprofam from boiling while it is within the fluid delivery tube 407.

Still referring to FIGS. 4 and 4A, the heated air stream 411 is propelled by blower 414, which intakes ambient air 413, forces it through both a filter 415 and an air-heating heat exchanger 416. In the air-heating heat exchanger 416, the temperature of the air is raised so that it within a range of about 200° C. to 370° C., and preferably within a more narrow range of about 315° C. to 345° C. Whether or not the liquid is converted to a vapor or is merely atomized is largely dependent on the energy which the liquid molecules absorb. The temperature of the air flowing through the atomization duct 412 may be adjusted to a level which favors atomization, or it may be raised to a level which will result in vaporization of the liquid. Ideally, the temperature to which the air stream 411 is heated is sufficiently above the saturation temperature for the desired atomized liquid content, so that as the air stream cools while en route to a tuber storage facility (not shown) via an aerosol conduit (also not shown) coupled to atomization duct 412, little or no condensation of the atomized liquid will occur within the delivery conduit. In one embodiment of the invention, chloroprofam is heated above 246° C. so that it becomes superheated. Thus when pressure is reduced as it is discharged into the atomization duct 412, it spontaneously boils. In another embodiment of the invention, the pressurized, heated chloroprofam is sprayed by the nozzle into the atomization duct to 412 to assist in its atomization. In still another embodiment of the invention, to assist in the complete atomization of the discharged heated chloroprofam 413, a heated plate 410 is positioned so that the chloroprofam discharged from the nozzle 409 impacts thereon. The heated plate 410 imparts additional thermal energy to the liquid 413, causing the discharged chloroprofam to thoroughly atomize. In yet another embodiment of the invention depicted in FIG. 4A, the chloroprofam discharged from the nozzle 409 is aimed at an ultrasonic vibrator element 418, which provides additional kinetic energy to the discharged liquid 413, thus aiding in the atomization process by shattering the stream of liquid chloroprofam into tiny droplets.

Figure 5:
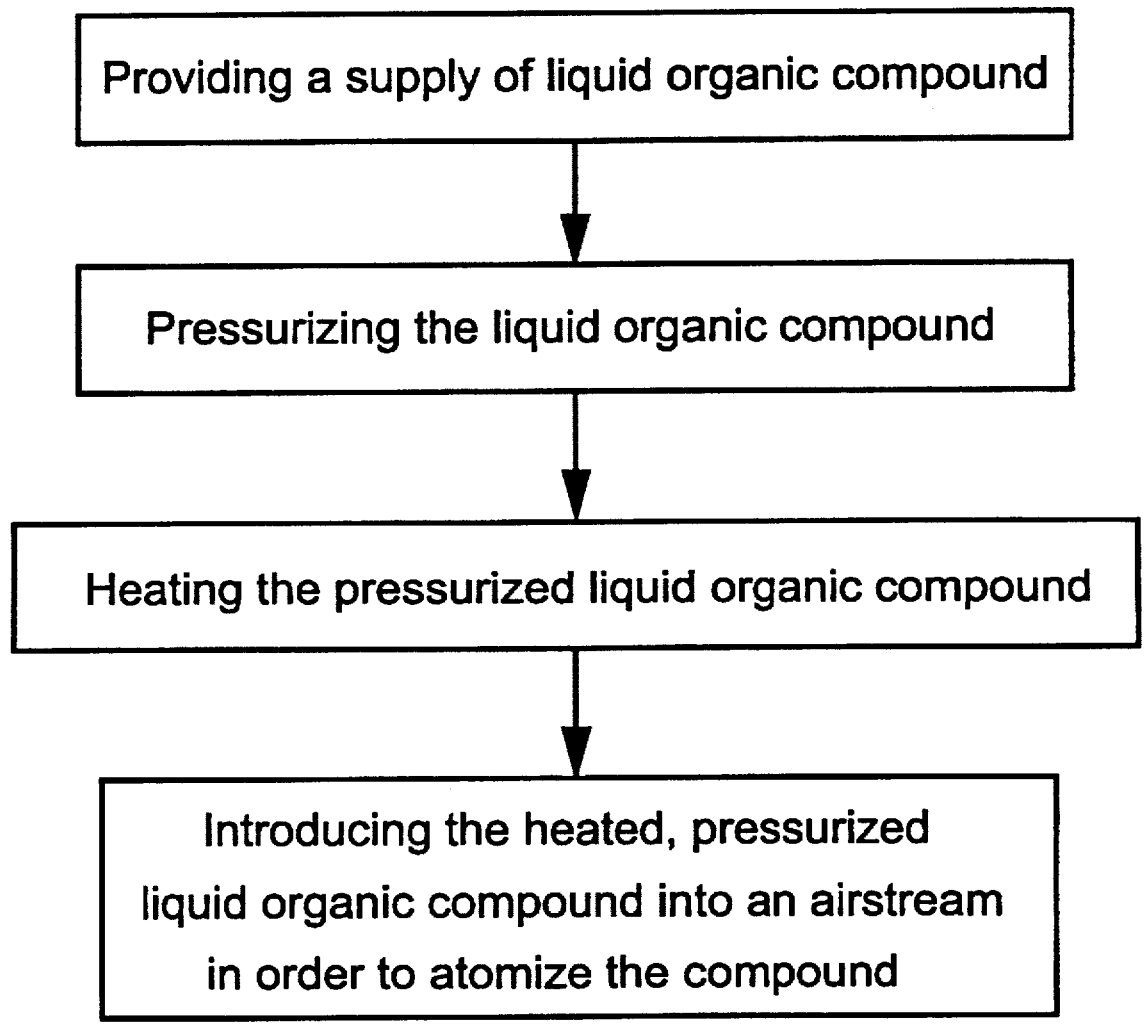
FIG. 5 is a flow chart which summarizes the improved method for atomizing chloroprofam.

Referring now to the flow chart of FIG. 5, the method includes the steps of purifying chloroprofam from a solution of chloroprofam and a carrier solvent by heating the solution and driving off the carrier solvent. Alternatively, the method may begin with solid chloroprofam. In either case, the purified chloroprofam, whether derived from a solution or a block of solidified material, is heated at atmospheric pressure to a temperature above the melting point, but below the boiling point. The melted chloroprofam is then pressurized and further heated. The pressurized, heated chloroprofam is then sprayed or injected into a moving stream of heated air, whereupon the chloroprofam atomizes. The heated air stream is maintained sufficiently above the saturation temperature so that, while the air stream cools while en route to a tuber storage facility, condensation of the droplets within the air stream is minimized. To further assist in the atomization of the heated liquid chloroprofam, it may be sprayed onto either a heated plate positioned within the air stream, or onto an ultrasonic vibrator element also positioned within the air stream. The heated plate transfers additional thermal energy to the chloroprofam droplets, while the ultrasonic vibrator element transfers additional kinetic energy.

Thus, it should be readily apparent from the above descriptions, that an improved atomization method is provided, which can be implemented by the embodiments of the heretofore described apparatus.

Although only several embodiments of the method for atomizing chloroprofam and several embodiments of the apparatus, which may be utilized to implement the method for atomizing, are disclosed herein, it will be obvious to those having ordinary skill in the art that changes and modifications may be made thereto without departing from the scope and the spirit of the invention as hereinafter claimed.

What is claimed is:

1. A method for atomizing an organic compound, said organic compound having a liquid phase, the method comprising the steps of:
   (a) pressurizing the organic compound in its liquid phase;
   (b) heating the pressurized liquid organic compound; and
   (c) discharging the heated pressurized organic compound into a moving air mass.

2. The method of claim 1, wherein the liquid organic compound is pressurized within a range of about $2.76 \times 10^6 N/m_2$ to $1.38 \times 10_7 N/m_2$.

3. The method of claim 1, wherein the liquid organic compound is pressurized within a preferred range of about $3.45 \times 10_6 N/m_2$ to about $6.9 \times 10_6 N/m_2$.

4. The method of claim 1, wherein the liquid organic compound is heated to a temperature within a range of about 149° C. to 371° C.

5. The method of claim 1, wherein the liquid organic compound is heated to a temperature within a range of about 246° C. to 315° C.

6. The method of claim 1, wherein the moving air mass is heated to a temperature within a range of about 150° C. to 315° C.

7. The method of claim 1, wherein the moving air mass is heated to a temperature within a range of about 225° C. to 270° C.

8. The method of claim 1, wherein the heated pressurized liquid organic compound is sprayed into the moving air mass via a nozzle.

9. The method of claim 1, which further comprises the step of imparting additional thermal energy to the heated pressurized liquid organic compound by discharging it against a heated plate.

10. The method of claim 1, which further comprises the step of imparting additional kinetic energy to the heated pressurized liquid organic compound by discharging it against an ultrasonic vibrator element.

11. The method of claim 1, wherein the organic compound is chloroprofam.

12. The method of claim 1, which further comprises the step of melting the organic compound to convert it from solid to liquid phase prior to pressurizing it.

13. The method of claim 1, which further comprises the step of heating a solution of the organic compound and a carrier solvent to drive off the solvent and thereby obtain purified organic compound in its liquid phase.

14. An apparatus for atomizing an organic compound having a liquid phase comprising:
   (a) an atomization duct through which a moving air mass is propelled;
   (b) a vessel for holding a supply of the organic compound in its liquid phase;
   (c) a heat exchanger for heating the liquid organic compound, said heat exchanger being fluidly coupled to said vessel;
   (d) an orifice fluidly coupled to said heat exchanger, said orifice discharging the heated, pressurized liquid organic compound into the atomization duct;
   (e) a pump for supplying the organic compound to said heat exchanger and to said orifice under pressure.

15. The apparatus of claim 14, wherein said pump also transports the liquid organic compound from the vessel to the heat exchanger.

16. The apparatus of claim 14, wherein said pump pressurizes the liquid organic compound within a range of about $2.76 \times 10^6 N/m_2$ to $1.38 \times 10_7 N/m_2$.

17. The apparatus of claim 14, wherein said pump pressurizes the liquid organic compound within a range of about $3.45 \times 10_6 N/m_2$ to about $6.9 \times 10_6 N/m_2$.

18. The apparatus of claim 14, wherein the liquid organic compound is heated as it passes through said heat exchanger to a temperature within a range of about 149° C. to 371° C.

19. The apparatus of claim 14, wherein the liquid organic compound is heated as it passes thorough said heat exchanger to a temperature within a range of about 246° C. to 315° C.

20. The apparatus of claim 14, wherein said orifice is incorporated in a nozzle which atomizes the pressurized, heated liquid organic compound as it is discharged.

21. The apparatus of claim 14, wherein the moving air mass is heated to a temperature within a range of about 150° C. to 315° C.

22. The method of claim 14, wherein the moving air mass is heated to a temperature within a range of about 225° C. to 270° C.

23. The apparatus of claim 14, wherein a solution containing the organic compound and a volatile carrier solvent is purified within the vessel by driving off the carrier solvent thorough the application of heat prior to delivery of the organic compound to the heat exchanger.

24. The apparatus of claim 14, wherein the organic compound is also transformed from its solid phase to its liquid phase within said vessel through the application of heat.

25. The apparatus of claim 14, which further comprises a heated plate against which the orifice discharges the pressurized, heated liquid organic compound, said plate imparting additional thermal energy to the heated pressurized liquid organic compound following its discharge into the atomization duct.

26. The apparatus of claim 14, which further comprises an ultrasonic vibrator element, against which the orifice discharges the pressurize, heated liquid organic compound, said vibrator element imparting additional kinetic energy to the heated pressurized liquid organic compound following its discharge into the atomization duct.

27. The apparatus of claim 14, wherein said organic compound is chloroprofam.

28. A method for treating tubers with an organic compound which suppresses sprouting comprising the steps of:
   (a) pressurizing the organic compound in its liquid phase;
   (b) heating the pressurized liquid organic compound;
   (c) discharging the heated pressurized organic compound into a moving air mass in order to atomize the organic compound; and
   (d) exposing the tubers to the moving air mass containing the atomized organic compound so that the atomized organic compound will coat an outer surface of each tuber so exposed.

29. The method of claim 28, wherein the liquid organic compound is pressurized within a range of about $2.76 \times 10^6 N/m_2$ to $1.38 \times 10_7 N/m_2$.

30. The method of claim 28, wherein the liquid organic compound is heated to a temperature within a range of about 149° C. to 371° C.

31. The method of claim 28, wherein the moving air mass is heated to a temperature within a range of about 150° C. to 315° C.

32. The method of claim 28, wherein the heated pressurized liquid organic compound is sprayed into the moving air mass via a nozzle.

33. The method of claim 28, which further comprises the step of imparting additional thermal energy to the heated pressurized liquid organic compound by discharging it against a heated plate.

34. The method of claim 28, which further comprises the step of imparting additional kinetic energy to the heated pressurized liquid organic compound by discharging it against a ultrasonic vibrator element.

35. The method of claim 28, wherein the organic compound is chloroprofam.

* * * * *